(12) United States Patent
Langhammer

(10) Patent No.: US 8,650,230 B1
(45) Date of Patent: Feb. 11, 2014

(54) LOGIC STRUCTURES AND METHODS SUPPORTING PIPELINED MULTI-OPERAND ADDERS

(71) Applicant: Altera Corporation, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/932,287

(22) Filed: Jul. 1, 2013

Related U.S. Application Data

(60) Continuation of application No. 13/755,929, filed on Jan. 31, 2013, now Pat. No. 8,510,357, which is a division of application No. 12/557,852, filed on Sep. 11, 2009, now Pat. No. 8,392,488.

(51) Int. Cl.
*G06F 7/00* (2006.01)
*G06F 15/00* (2006.01)

(52) U.S. Cl.
USPC ............ 708/200; 708/209; 708/230; 708/232

(58) Field of Classification Search
None
See application file for complete search history.

(56) References Cited

U.S. PATENT DOCUMENTS

| 7,565,388 | B1 | 7/2009 | Baeckler et al. | |
|---|---|---|---|---|
| 2004/0049528 | A1* | 3/2004 | Jalfon | 708/552 |
| 2009/0271465 | A1* | 10/2009 | Pistorius et al. | 708/670 |

* cited by examiner

*Primary Examiner* — Scott Sun
(74) *Attorney, Agent, or Firm* — Ropes & Gray LLP; Jeffrey H. Ingerman

(57) ABSTRACT

Circuitry for adding together three long numbers may include the formation of redundant form sum bit signals and redundant form carry bit signals. These signals may be finally combined in a ripple carry adder chain that produces sum bit output signals and ripple carry bit signals. Both a ripple carry bit signal and a redundant form carry bit signal must be passed from the circuitry performing each place of the addition to the circuitry performing the next-more-significant place of the addition. Various techniques are disclosed for facilitating subdividing long chains of such circuitry, as well as possibly including (between such subdivisions) "pipeline" registers for both ripple and redundant form carry bit signals.

19 Claims, 10 Drawing Sheets

| 37R1 | 37R2 | X | Y1 | Y2 |
|------|------|------|------|------|
| 0 | 0 | 000 | 00 | 0 |
| 1 | 0 | 111 | 00 | 1 |
| 0 | 1 | 000 | 11 | 1 |
| 1 | 1 | 111 | 11 | 1 |

FIG. 7

| 37R1 [2:1] | 37R2 | Ripple Carry |
|---|---|---|
| 00 | 0 | 0 |
| 01 | 0 | 1 |
| 10 | 0 | X |
| 11 | 0 | X |
| 00 | 1 | X |
| 01 | 1 | 0 |
| 10 | 1 | 1 |
| 11 | 1 | X |

FIG. 10

LOGIC STRUCTURES AND METHODS SUPPORTING PIPELINED MULTI-OPERAND ADDERS

CROSS REFERENCE TO RELATED APPLICATION

This is a continuation of commonly-assigned U.S. patent application Ser. No. 13/755,929, filed Jan. 31, 2013, now U.S. Pat. No. 8,510,357, which is a division of, and was copending with, commonly-assigned U.S. patent application Ser. No. 12/557,852, filed Sep. 11, 2009, U.S. Pat. No. 8,392,488, each of which is hereby incorporated by reference herein in its respective entirety.

BACKGROUND OF THE INVENTION

This invention relates to integrated circuits, and more particularly to circuitry on integrated circuits that facilitates the performance of certain kinds of arithmetic operations within the integrated circuit.

Baeckler et al. U.S. patent application Ser. No. 10/718,968, filed Nov. 21, 2003 (hereby incorporated by reference herein in its entirety) shows examples of logic circuitry (e.g., on an integrated circuit) that can efficiently perform the addition of three multi-digit or multi-bit, variable, binary numbers. The Baeckler et al. reference shows doing this by separately forming a "redundant form" sum bit and a "redundant form" carry bit from the three bits in each "place" (bit position) of the numbers to be added. The redundant form sum bit is the binary sum of the three bits to be added in that bit position. Any carry from that operation is ignored. The redundant form carry bit is equal to the "majority" of the three bits to be added in that bit position (e.g., 0+0+0=0, 0+0+1=0, 0+1+1=1, and 1+1+1=1). Ripple carry adder circuitry is then used to combine the redundant form sum and carry bits to produce the final sum of the three inputs. In particular, each "stage" of the ripple carry adder receives (1) the redundant form sum bit for a respective one of the bit positions of the inputs, (2) the redundant form carry bit from the next less significant bit position of the inputs, and (3) a ripple carry bit output by the ripple carry adder stage for the next less significant bit position of the inputs. Each stage of the ripple carry adder produces (1) a final sum output bit equal to the sum of the inputs that this ripple carry adder stage receives, and (2) a ripple carry output bit equal to the carry (0 or 1) from the last-mentioned sum.

Some applications of circuitry of the type described above may require the addition of very long numbers (e.g., more than 90 binary digits ("bits")). This requires use of a correspondingly long ripple carry adder. It can take a relatively long time for signal information to propagate through such a ripple circuit. This can increase the operating cycle time of the circuitry, which can be undesirable.

SUMMARY OF THE INVENTION

In accordance with certain possible aspects of the invention, any of several techniques may be used to introduce "pipelining" registers into both the ripple carry chain and the redundant form carry bit signal routing in circuitry of the type described above. Other possible aspects of the invention relate to methods of operating circuitry of the type described above so that there can be "pipelining" in the ripple carry chain and in the redundant form carry bit signal routing of the circuitry. Pipelining is capturing a signal in a register during one clock signal cycle, and then outputting that signal from the register during the next clock signal cycle.

Further features of the invention, its nature and various advantages will be more apparent from the accompanying drawings and the following detailed description.

BRIEF DESCRIPTION OF THE DRAWINGS

FIG. 7 is a chart illustrating operation of a portion of the FIG. 6 circuitry in accordance with the invention.

FIG. 10 is a chart illustrating operation of circuitry that can be used with circuitry of the type shown in FIG. 9 in accordance with the invention.

DETAILED DESCRIPTION

Although this invention relates to performing certain kinds of arithmetic, mathematical, and/or logical operations, it will be understood that all embodiments of the invention employ electrical circuitry for performing these operations on electrical signals having at least one electrical signal property (e.g., voltage) that is indicative of a numerical or logical value (e.g., relatively high voltage indicates binary 1 or logical "true"; relatively low voltage indicates binary 0 or logical "false"). It will therefore be understood that all of the FIGS. herein (except for FIGS. 7 and 10) show electrical circuitry. It will also be understood that all references herein to numbers, digits, bits, values, and the like do not refer to abstract numbers, digits, etc., but rather to these items as represented by electrical signals. It will also be understood that phrases like "arithmetic significance," "least significant," "most significant," "less significant," and "more significant" are used in the conventional way (well known to those skilled in the art). Thus in the binary number 1001 (having decimal equivalent value 9) the left-most 1 is in the most significant bit position, place, or stage; the 0 just to the right is in the next less significant bit position, place, or stage; the next 0 to the right is in the next less significant bit position, place, or stage; and the right-most 1 is in the least significant bit position, place, or stage. (To complete the possibly useful examples, the left-most 1 is in the next more significant bit position, place, or stage relative to the 0 to its immediate right.)

Figure 1:
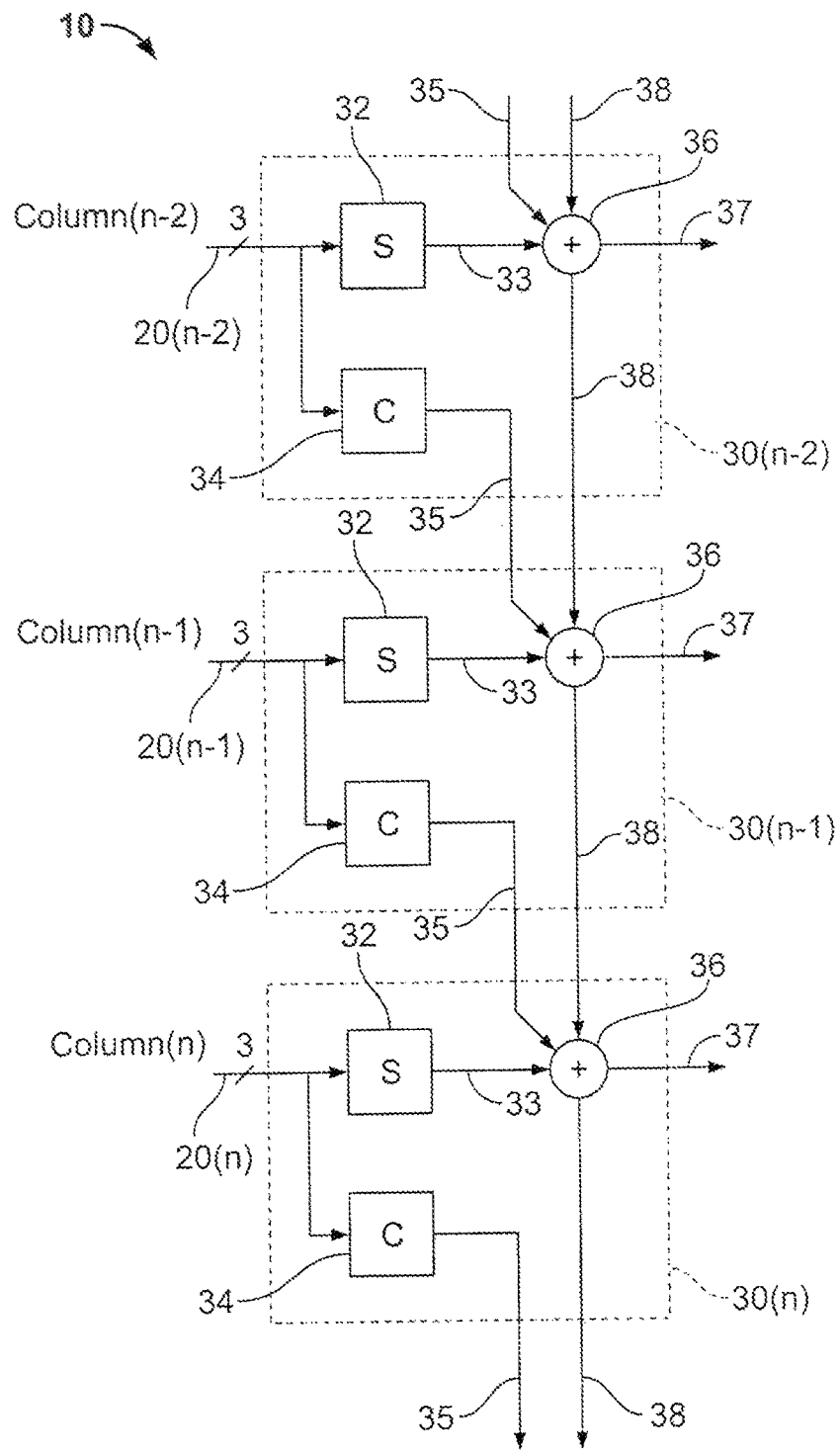
FIG. 1 is a simplified schematic block diagram of a representative portion of illustrative, previously known circuitry of the type with which the invention can be used.

FIG. 1 shows an example of the type of known circuitry that is described in the background section of this specification. Circuitry 10 may be part of an integrated circuit of the type known as a field-programmable gate array ("FPGA"); but this is only an example of the type of integrated circuit in which circuitry 10 may be implemented, and many other integrated circuit contexts for circuitry 10 (and embodiments of the present invention) will be apparent to those skilled in the art.

FIG. 1 shows portions of three representative adaptive logic modules ("ALMs") $30(n-2)$, $30(n-1)$, and $30(n)$ in circuitry 10. (ALMs 30 may also sometimes be referred to as subregions of logic module circuitry or the like.) These three ALMs 30 are shown being used to respectively perform three places of addition of three variable binary numbers. The least significant place of the depicted portion of this addition is performed in ALM $30(n-2)$, the next more significant place is performed in ALM $30(n-1)$, and the next more significant place is performed in ALM $30(n)$. The appropriate place (bit) of each of the three numbers to be added by ALM $30(n-2)$ is input to that ALM via the three leads $20(n-2)$. The appropriate place of each of the three numbers to be added by ALM $30(n-1)$ is input to that ALM via the three leads $20(n-1)$. And the appropriate place of the each of the three numbers to be added by ALM $30(n)$ is input to that ALM via the three leads $20(n)$.

In each ALM 30, circuitry 32 (e.g., a three-input look-up table circuit that has been appropriately programmed) provides (outputs) a redundant form sum bit 33 indicative of the redundant form sum of the three variable inputs 20 received by that circuitry. Also in each ALM 30, circuitry 34 (e.g., another three-input look-up table circuit that has been appropriately programmed) provides (outputs) a redundant form carry bit 35 indicative of the redundant form carry of the three variable inputs 20 received by that circuitry.

As shown in FIG. 1, the redundant form sum bit signal 33 output by the circuitry 32 in each ALM 30 is applied to ripple carry adder circuitry 36 in that ALM. Another input to the ripple carry adder circuitry 36 in each ALM 30 is the redundant form carry output signal 35 of the ALM 30 handling the next less significant inputs 20. As just one representative example of this, redundant form carry bit signal 35 from ALM $30(n-2)$ is applied to the ripple carry adder circuitry 36 in ALM $30(n-1)$. The third input to the ripple carry adder circuitry 36 in each ALM 30 is the ripple carry bit output signal 38 of the ripple carry adder circuitry 36 in the ALM 30 that is handling the next less significant inputs 20. Again, as just one representative illustration of this, the ripple carry output 38 of ALM $30(n-2)$ is applied to the ripple carry adder circuitry 36 in ALM $30(n-1)$.

Each ripple carry adder circuit 36 adds the binary values indicated by the three signals applied to it and produces (1) a final sum bit output signal 37 indicative of the sum of those inputs, and (2) a ripple carry bit output signal 38 indicative of any overflow (carry; 1 or 0) from the last-mentioned sum.

It will be seen from FIG. 1 that the longer the binary numbers 20 that are to be added (i.e., the more bit positions those numbers have, meaning (inter alia) that n reaches larger values), the longer it takes for necessary ripple carry signal information to propagate through all of the ripple carry circuits 36 employed in performing the addition. The final result of the addition is not available until the last ripple carry circuit 36 in the ripple carry adder chain or series has received all of its necessary final inputs and is therefore able to produce its final sum bit output 37. If such an addition must be performed in one cycle of the integrated circuit's clock signal, that clock must be run sufficiently slowly to allow time for a long ripple carry adder chain to complete its operation (i.e., signal propagation along the entire length of that chain). This may mean undesirably slow operation of many other parts of the integrated circuit that also employ the clock signal.

Figure 2:
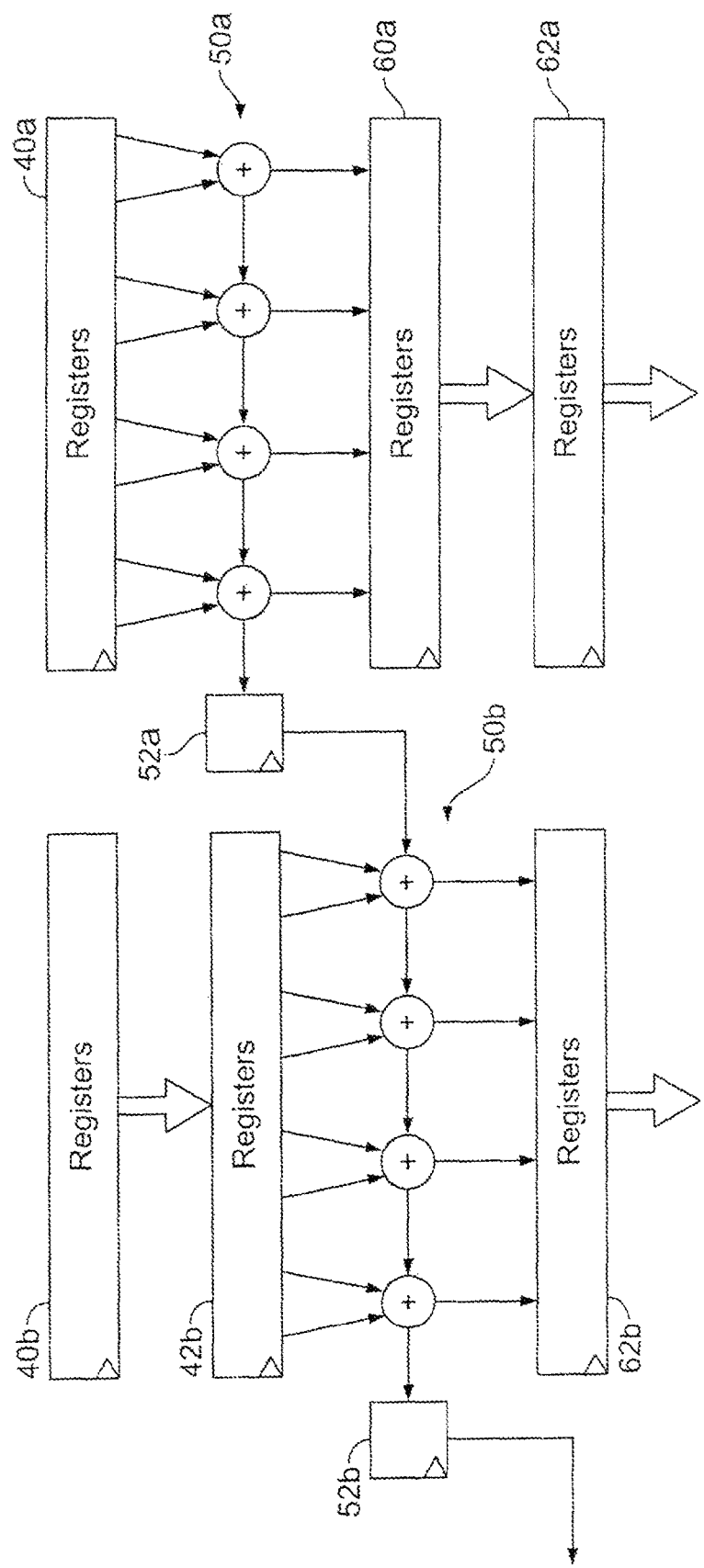
FIG. 2 is a simplified schematic block diagram of a representative portion of previously known circuitry that illustrates the concept of pipelining in a long chain addition.

"Pipelining" can be used to break or interrupt long signal propagation paths or chains and thereby prevent such long chains from dictating the use of undesirably slow clocks. FIG. 2 shows an example of pipelining in generic ripple carry adder circuitry (not of the kind that is the subject of this invention because only able to add two numbers and not employing redundant form sum and carry signals as intermediaries to final outputs).

In FIG. 2 the bits of the two binary numbers to be added are stored (registered) in registers 40a and 40b. In this example, the four less-significant bits of each of these numbers are stored in registers 40a, and the four more-significant bits are stored in registers 40b. Arithmetic significance increases toward the left, as is conventional for representing multi-digit numbers in all common number systems. Each of adders 50a adds the bits from a respective bit location in each of the two numbers that are output by registers 40a. Each adder 50a applies the resulting sum bit to a respective one of pipeline registers 60a. Each adder 50a also passes a ripple carry signal to the next more significant adder 50a, the most significant adder 50a applying its ripple carry output signal to pipeline register 52a. The sum bits from adders 50a are stored in pipeline registers 60a, and the most significant carry bit from adders 50a is stored in pipeline register 52a.

During the clock cycle in which adders 50a are doing the above-described work, the bits that are to be added by adders 50b advance from registers 40b to pipeline registers 42b, but these bits are not yet added. During the next clock cycle, adders 50b add the bits from pipeline register 42b (also making use of the carry-in signal from pipeline register 52a). The resulting sum bits are stored in registers 62b, and the resulting most-significant carry-out bit is stored in pipeline register 52b. Also during that clock cycle, the data in pipeline registers 60a passes to registers 62a. Thus at the end of this second clock cycle, the full final result of the addition is simultaneously available at the outputs of registers 62a, 62b, and 52b (for any overflow into a next more significant bit position).

Although two clock cycles have been required to complete the addition using FIG. 2 type circuitry, those clock cycles can each be shorter in time than a single clock cycle in which the entire addition needed to be completed. This enables other circuitry on the integrated circuit to have the benefit of a faster clock. In other words, using pipelining as shown in FIG. 2 may somewhat slow down the performance of long-chain operations like addition of long numbers, but it can speed up other operations on the integrated circuit.

Note that pipelining as in FIG. 2 necessitates the inclusion of a pipeline register like 52a in the ripple carry adder chain. If such a chain is pipelined at more than one point, then such a pipeline register (like 52a) must be included at each such point in the chain. The simple ripple carry addition shown in FIG. 2 requires only one carry signal pipeline register at each such point. The more complicated redundant form addition illustrated by FIG. 1 requires the inclusion of two pipelining registers at each pipelining point. One of these carry pipelining registers is for the ripple carry signal where the chain is broken. The other of these carry pipelining registers is needed for the redundant form carry signal where the chain is broken. Certain aspects of the present invention relate to providing such pipelining registers in various circuit contexts.

One context in which it may be desired to use this invention is in field-programmable gate array ("FPGA") integrated circuits or in other devices of that general kind (all of which will be generically referred to as FPGAs, even though some such devices may be mask-programmable rather than field-programmable). FPGAs typically include large-numbers of identical or substantially identical logic modules ("LMs") or adaptive logic modules ("ALMs"). Because ALMs have already been mentioned above as an example, that term will continue to be used as a generic term for the various kinds of logic modules that different FPGA integrated circuits may have.

Figure 3:
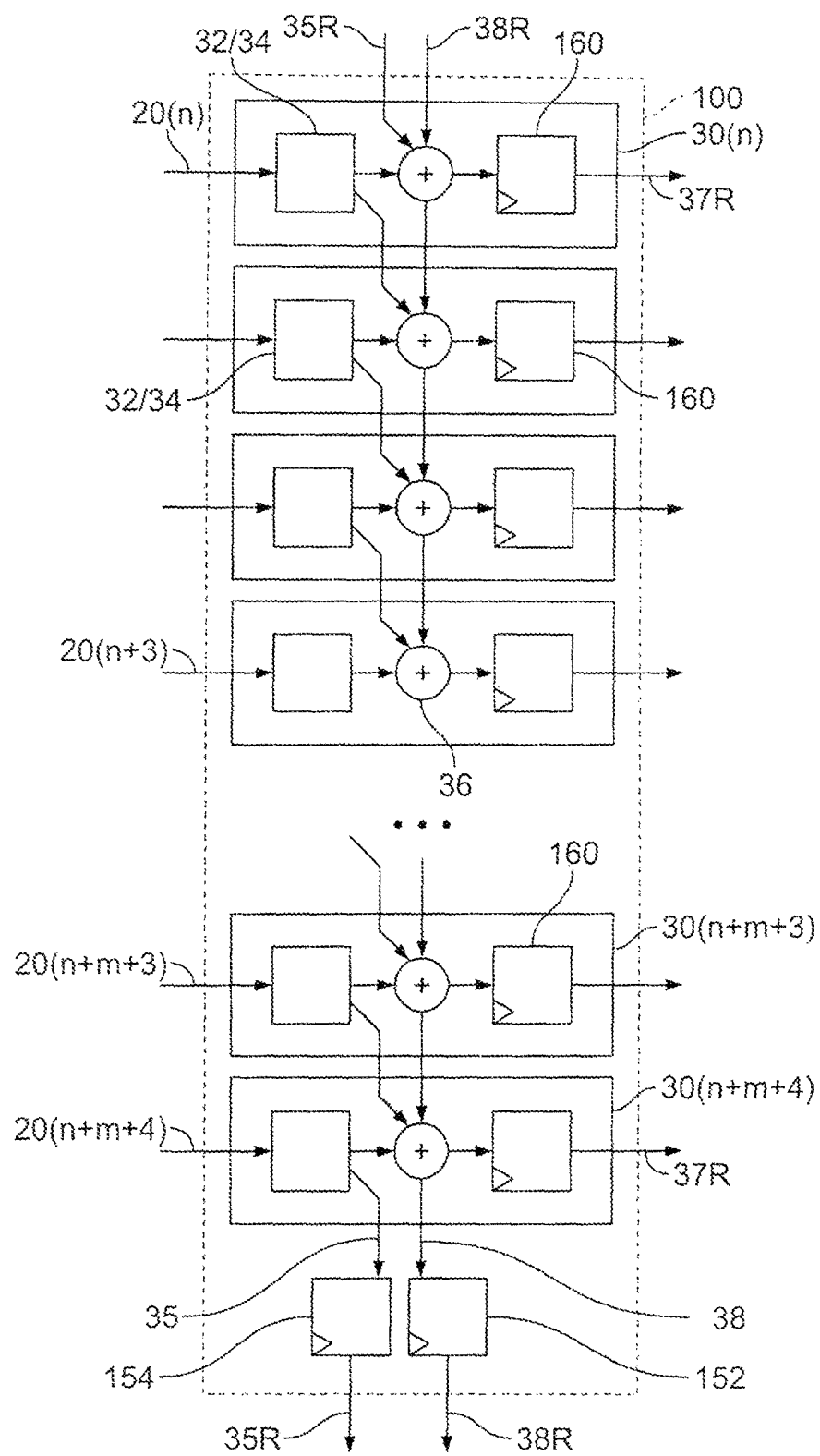
FIG. 3 is a simplified schematic block diagram of a representative portion of an illustrative embodiment of circuitry constructed in accordance with the invention.

In a typical "architecture' (i.e., general organization of the circuitry) of an FPGA, multiple ALMs are clustered together in groups that may be called logic array blocks ("LABs"). FIG. 3 shows a representative one of such LABs 100. (LABs 100 may also sometime be referred to as regions of logic array block circuitry or the like.) LAB 100 includes a predetermined number of ALMs 30, which can be like those shown in FIG. 1. The only difference between what is shown in FIG. 1 and what is shown in FIG. 3 for each ALM 30 is that FIG. 3 shows that each final sum bit 37 may be registered in a register 160 in the ALM producing that bit, and that the registered final sum bit can then be output in registered form 37R.

In accordance with the present invention in the context being discussed, each LAB 100 may include a pipeline register 152 for registering the ripple carry signal 38 from the last ripple carry adder 36 in the ripple carry adder chain in that LAB. Further in accordance with the present invention in this context, each LAB 100 may include a pipeline register 154 for registering the redundant form carry signal 35 from the circuitry 34 of the ALM $30(n+m+4)$ that includes the last ripple carry adder circuit 36 in the ripple carry chain in that LAB. Pipelined signals 35R and 38R can be applied to another LAB 100 in a series of LABs that is being used to perform an addition that is longer than can be performed in any one LAB. In particular, pipelined signals 35R and 38R are applied to the ripple carry adder circuitry 36 at the start of the ripple carry chain in the next LAB in the series of LABs being used for such a long addition operation. This allows the long addition operation to be broken down for performance in two or more clock cycles, thereby achieving the advantages of pipelining with the addition of only a relatively small amount of circuitry (i.e., registers 152 and 154) to each LAB 100.

Figure 4:
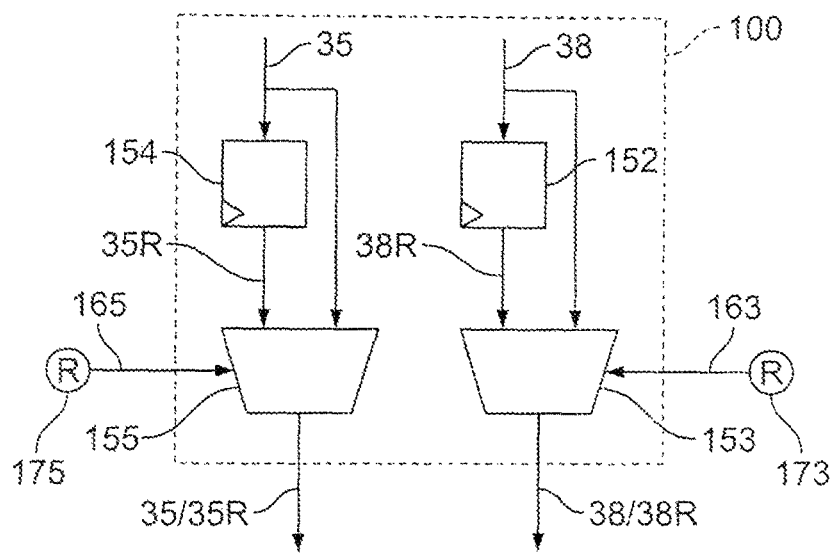
FIG. 4 is a simplified schematic block diagram of an illustrative embodiment of an alternative construction of a portion of circuitry of the type shown in FIG. 3 in accordance with the invention.

FIG. 4 shows a modification of the FIG. 3 circuitry that permits the ripple carry 38 and redundant form carry 35 output of each LAB 100 to be either pipelined or not pipelined, as desired by the user of the circuitry. In particular, multiplexer ("mux") circuits 153 and 155 are added to each LAB 100. The selectable inputs to mux 153 are (1) the ripple carry input 38 to register 152, and (2) the registered ripple carry output 38R of register 152. The two selectable inputs to mux 155 are (1) the redundant form carry input 35 to register 154, and (2) the registered redundant form carry output 35R of register 154. Each of muxes 153 and 155 can be controlled by its respective selection control signal 163 and 165 to provide as its output signal either one of its selectable input signals. In this way the end of a ripple carry adder chain in any LAB 100 can be used as a pipelining point in a long addition, or not used as such a pipelining point, as desired. In other words, muxes 153 and 155 allow the associated pipelining registers 152 and 154 to be either used for pipelining or bypassed (no pipelining at this point) as desired by the user of the circuitry. (Selection control signals 163 and 165 may come from programmable memory elements 173 and 175 on integrated circuit 10.)

In embodiments of the type shown in FIG. 3, pipelining registers 152 and 154 are available only at fixed intervals along a ripple carry chain that extends through more than one LAB 100. Some users of the circuitry may want carry pipelining at different points in a long addition operation that needs to be performed. This need can be met without changing the circuitry in accordance with certain aspects of the invention that will now be illustratively described.

Assume, for example, that the user wants pipelining to occur several ALMs 30 prior to the end of the ripple carry adder chain in a LAB 100. For ease of reference, assume that the last ALM before the desired pipelining is ALM 30x and that the last ALM in the ripple carry adder chain is ALM 30y (also identified as ALM $30(n+m+4)$ in FIG. 3). Then in accordance with this illustrative embodiment of this possible aspect of the invention, ALM 30y, ALM 30x, and all ALMs upstream (along the ripple carry adder chain) from ALM 30x are put in shared arithmetic mode (i.e., the mode in which the ALMs are generally placed for purposes of this invention as described thus far). All ALMs between ALM 30x and ALM 30y are put in normal arithmetic mode. The ripple carry adder chain functions in normal arithmetic mode, but an ALM in that mode does not output a redundant form carry bit to the next adjacent downstream ALM. Nor does an ALM in normal arithmetic mode input a redundant form carry bit from the next adjacent upstream ALM.

With the various ALMs in LAB 100 in the modes specified in the preceding paragraph, the inputs 20 to ALM 30x are repeated as the inputs 20 to ALM 30y. The circuitry 34 in ALM 30y is set up to provide the redundant form carry output 35 from those input signal values. The other requirement for this mode of operation is to propagate the ripple carry output 38 from ALM 30x along the remainder of the ripple carry chain so that this same ripple carry output is the output 38 of ALM 30y. This is accomplished as follows. In each of the ALMs between ALM 30x and ALM 30y, the circuitry generating the sum bit that is applied to the ripple carry adder circuitry 36 in that ALM is set to always generate a 1 and the circuitry generating the carry bit is set to always generate a 0. This will propagate the output 38 of ALM 30x to the output 38 of ALM 30y. The foregoing mode of operating the described LAB 100 transmits both the redundant form carry output signal 35 of ALM 38x and the ripple carry output signal 38 of that ALM to the pipelining registers 152 and 154 at the downstream end of the ripple carry adder chain in that LAB.

A slightly different mode of operation (from that which has just been described) is employed if there is only one ALM 30 ("ALM 30a" for reference) between ALM 30x and ALM 30y. In such a case ALM 30a can be placed in shared arithmetic mode (like all other ALMs in the LAB). The inputs 20 to ALM 30x are again applied to ALM 30a. Redundant form carry circuitry 34 in ALM 30a is set to generate the redundant form carry signal value 35 as usual, but redundant form sum circuitry 32 in ALM 30a is set to generate a redundant form sum signal value 33 that is the inverse of the redundant form carry signal value. This causes ALM 30a to have no net effect on the ripple carry signal propagating through the ripple carry adder chain, which again means that the output 38 of ALM 30y is the same as the output 38 of ALM 30x.

In accordance with another possible aspect of the invention, it is not necessary to add pipelining registers like 152 and 154 to LABs 100 in order to achieve pipelining between segments of long redundant form adder operations. Instead, the output registers that are already present in the ALMs can be used as pipelining registers for the redundant form carry bit and the ripple carry bit as will now be described.

The following example assumes that one segment of the addition is being performed in LAB 100*a* (for reference), and that the next segment of the addition is being performed in LAB 100*b* (for reference). (It will be understood, however, that these two segments of the addition could instead be performed in two portions of one LAB if desired.) The following example further assumes that pipelining is desired for the redundant form carry out and ripple carry out bits of the circuitry of ALM 30*r* in LAB 100*a*, and that LAB 100*a* includes at least two further ALMs 30*s* and 30*t* downstream from ALM 30*r* along the ripple carry adder chain in LAB 100*a*. After the above-mentioned pipelining, meaningful addition will continue in ALM 30*w* in LAB 100*b*, but LAB 100*b* includes at least two other ALMs 30*u* and 30*v* upstream from ALM 30*w* along the ripple carry adder chain in LAB 100*b*.

In the above structure, ALM 30*s* is used to output the ripple carry bit from LAB 100*a*. The normal output register 160 of ALM 30*s* can be used as a pipeline register for this ripple carry output bit. ALM 30*t* is used to output the redundant form carry bit from LAB 100*a*. The normal output register 160 of ALM 30*t* can be used as a pipeline register for this redundant form carry bit. The normal interconnection resources of the integrated circuit can be used to route the above LAB 100*a* outputs to still other ALMs (30*d-f* for reference), which process the LAB 100*a* outputs for use as inputs to ALMs 30*u* and 30*v* so that the last-mentioned ALMs can restart the redundant form and ripple carry operations in LAB 100*b*. (The normal interconnection resources of the device can also be used to route outputs of ALMs 30*d-f* to the inputs 20 of ALMs 30*u* and 30*v*.) The above will now be more specifically described with reference to FIGS. 5-7.

Figure 5:
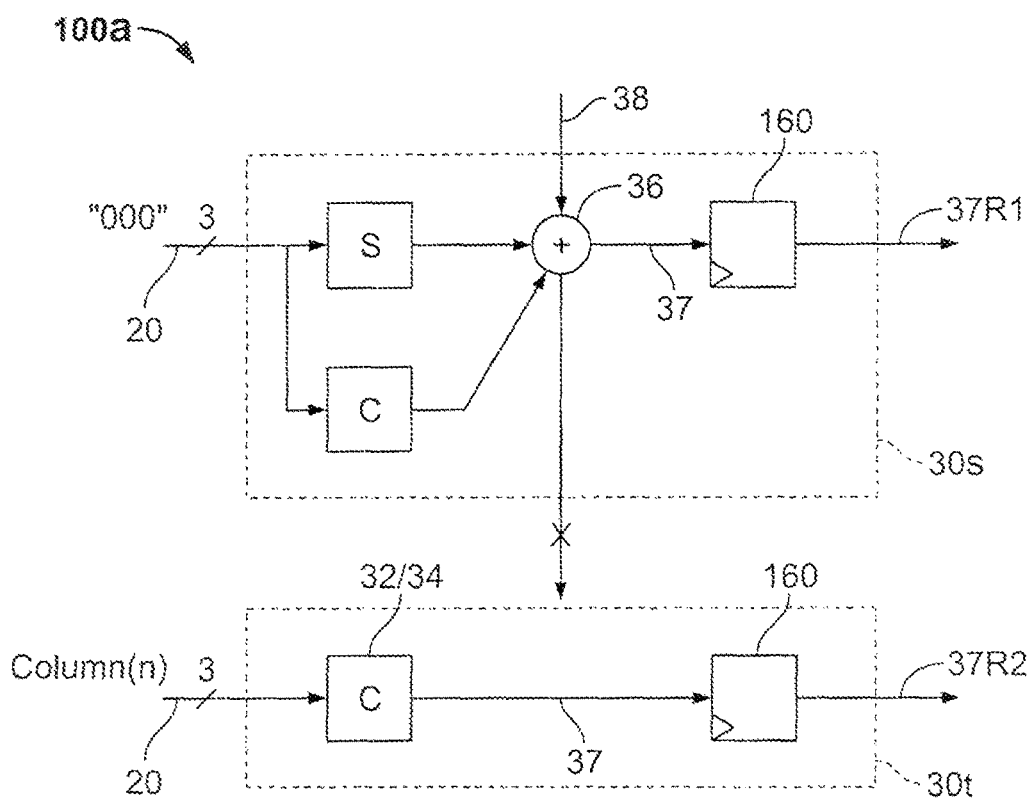
FIG. 5 is a simplified schematic block diagram of an illustrative embodiment of another alternative construction of a portion of circuitry of the type shown in FIG. 3 in accordance with the invention.

FIG. 5 shows above-mentioned ALMs 30*s* and 30*t* in LAB 100*a*. ALM 30*s* is put into normal arithmetic mode, and the inputs 20 to that ALM are set to all zeros. This causes ALM 30*s* to output via its normal sum out lead 37 the ripple carry signal from ALM 30*r* (just upstream from ALM 30*s* along the ripple carry adder chain). The normal output register 160 in ALM 30*s* can be used to register this ripple carry signal for pipelining of that signal. The output signal of register 160 in ALM 30*s* is called signal 37R1 for reference.

Also as shown in FIG. 5, above-mentioned ALM 30*t* in LAB 100*a* is put into normal logic mode (in which it can produce an output signal that is any selectable one of several logical functions of the inputs 20 applied to that ALM). The inputs applied to ALM 30*r* are again applied to the inputs 20 to ALM 30*t*, and the logic 32/34 of that ALM is set up as a majority coder. This enables this logic to output a signal 37 that is the same as the redundant form carry signal produced by ALM 30*r*. This signal can be registered by the normal output register 160 in ALM 30*t*, thereby providing pipelining for the redundant form carry signal of ALM 30*r*. This pipelined redundant form carry output signal of ALM 30*t* is called signal 37R2 for reference.

Figure 6:
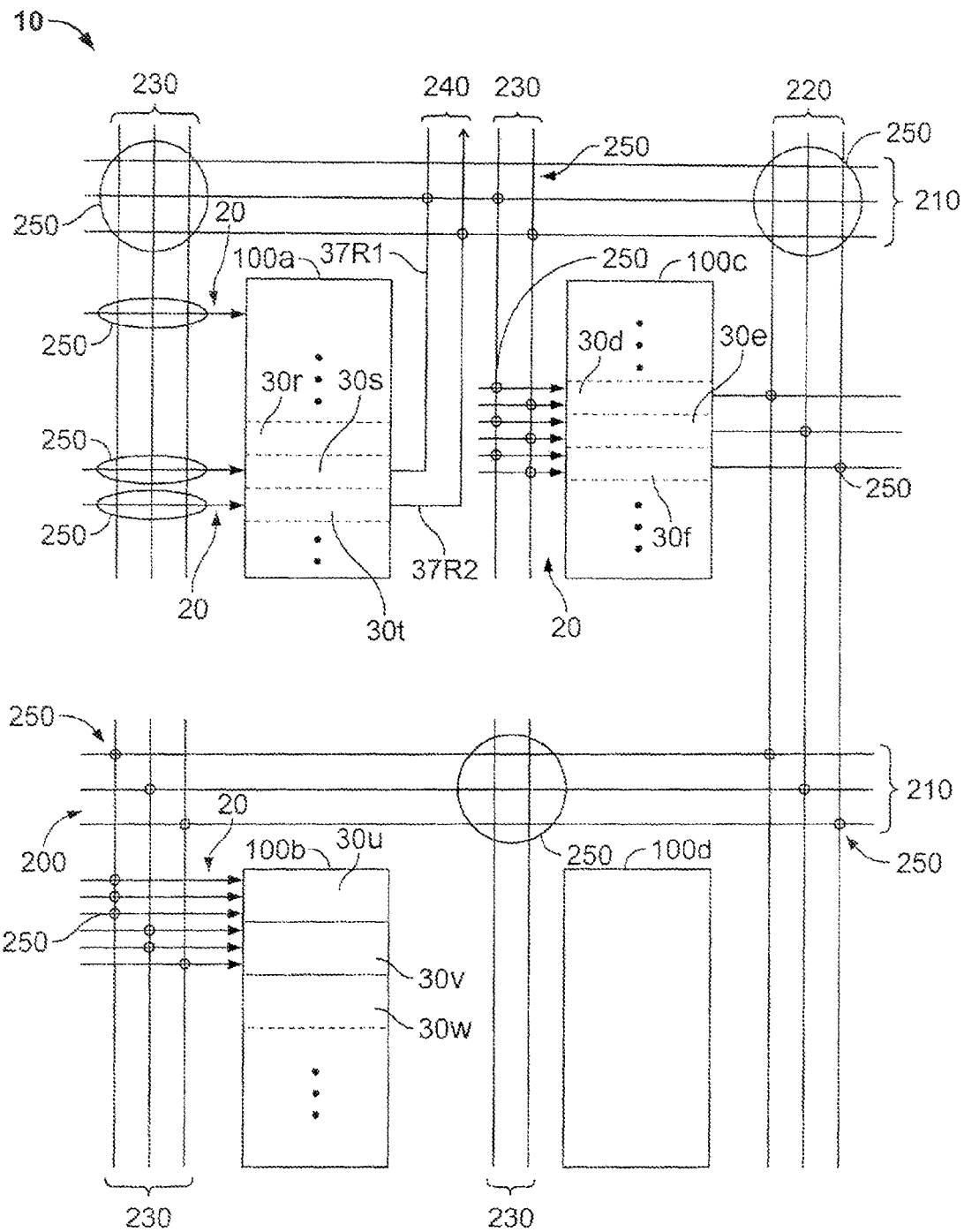
FIG. 6 is a simplified schematic block diagram of an illustrative embodiment of a larger circuit context that can include circuitry of the type shown in FIG. 5 in accordance with the invention.

FIG. 6 shows an illustrative embodiment of more circuitry 10 of the type that may include LABs like 100*a* and 100*b*. For example, FIG. 6 shows illustrative circuitry 200 of the type that may be used for routing signals to, from, and/or between the various LABs 100 and other components on integrated circuit device 10. Such circuitry 200 may be referred to as routing circuitry, interconnection resources, or the like of device 10. Circuitry 200 may include various types or groups of interconnection conductors (e.g., horizontal conductors 210 extending along various rows of LABs 100, vertical conductors 220 extending between various rows of LABs 100, LAB line conductors 230 for bringing signals from other adjacent conductors into proximity to the various LABs 100, and output conductors 240 for conveying output signals of various LABs 100 out to other adjacent conductors. Interconnection resources 200 may also include resources 250 for controllably or selectively (e.g., programmably) making connections between various types of conductors where those conductors cross over one another. In some areas in FIG. 6 these crossing-conductors interconnection resources are shown only generally (by large circles or ellipses) to indicate many possible connections that can be made. In other cases in FIG. 6 particular connections that may be made are shown by small circles so that illustrative routing of some particular signals can be more precisely followed. It will be understood that FIG. 6 shows only some representative circuitry of all of the various kinds that are included, and that an actual device of type 10 will typically have many more instances of all of these various kinds of resources.

FIG. 6 shows ALMs 30*s* and 30*t* outputting the pipelined ripple carry and redundant form carry signals 37R1 and 37R2 as described earlier. FIG. 6 further shows routing these two signals to ALMs 30*d-f* in LAB 100*c*. (This routing is through output conductors 240 of LAB 100*a*, horizontal conductors 210 serving the LAB row that includes LABs 100*a* and 100*c*, and the LAB line conductors 230 of LAB 100*c*.

ALMs 30*d-f* are set (in normal logic mode) to perform the logic shown in FIG. 7, with ALM 30*d* producing the variable X, ALM 30*e* producing the variable Y1, and ALM 30*f* producing the variable Y2. For example, when 37R1 and 37R2 are both 0, ALM 30*d* produces X=0, ALM 30*e* produces Y1=0, and ALM 30*f* produces Y2=0. As another example, when 37R1 is 1 and 37R2=0, X=0, Y1=0, and Y2=1.

FIG. 6 shows the X output of ALM 30*d* being routed to above-mentioned ALM 30*u* and applied to all three inputs 20 of that ALM. (See also FIG. 8, and also note that ALM 30*u* does not need to be the top-most ALM in LAB 100*b*.) (ALMs 30*u-w*, etc., in LAB 100*b* are in shared arithmetic mode.) FIG. 6 also shows the Y1 output of ALM 30*e* being routed to two of the three inputs 20 to ALM 30*v*, and the Y2 output of ALM 30*f* being routed to the third input 20 of ALM 30*v*. These inputs to ALMs 30*u* and 30*v* allow these ALMs to recreate the redundant form carry and ripple carry outputs of ALM 30*r* as those same inputs to ALM 30*w*. This allows the addition operation to continue in ALM 30*w* and subsequent ALMs in LAB 100*b*. Of course, there has been pipelining of the redundant form carry and ripple carry signals between LABs 100*a* and 100*b* as described above.

Figure 8:
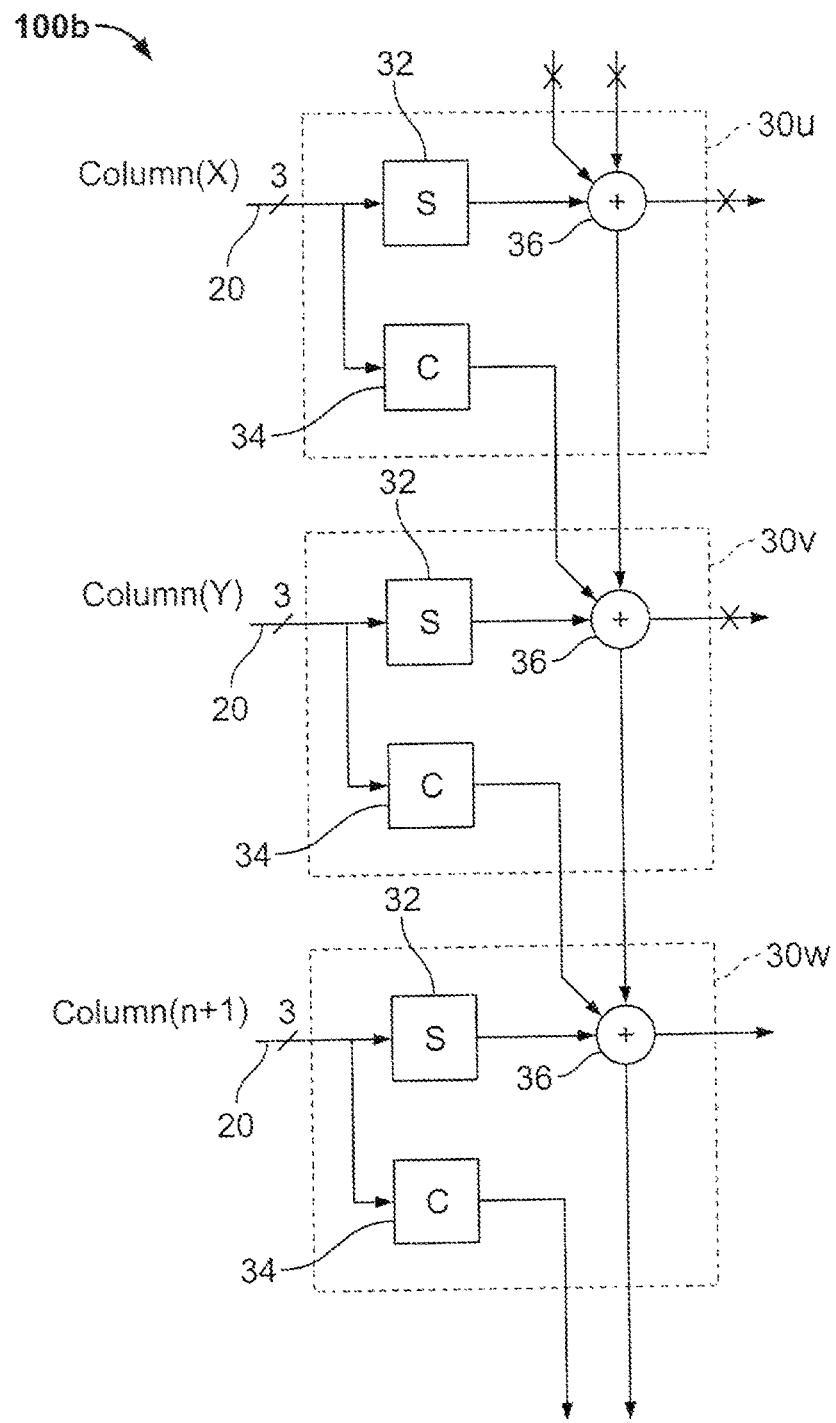
FIG. 8 shows an illustrative embodiment of construction of a portion of the FIG. 6 circuitry in more detail.
Figure 9:
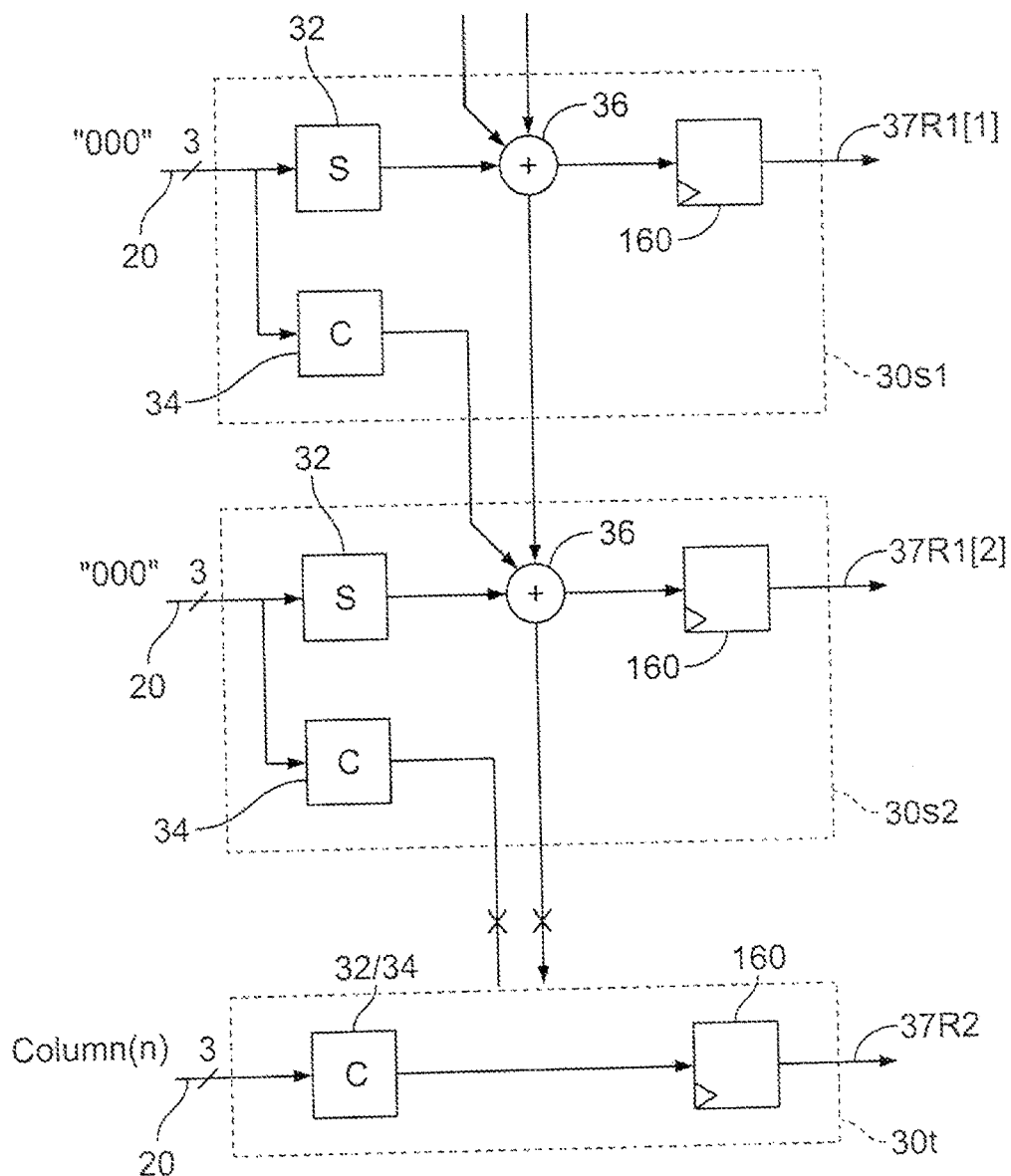
FIG. 9 is a simplified schematic block diagram of an alternative embodiment of circuitry of the type shown in FIG. 5 in accordance with the invention.

FIG. 9 shows an illustrative alternative way that the ripple and redundant form carry signals can be output from LAB 100*a* with pipelining of those signals without any additional circuitry needing to be added to what is conventionally provided in LABs. FIG. 9 therefore begins another embodiment that is generally similar to the embodiment shown in FIGS. 5-8.

In the FIG. 9 alternative, two ALMs 30*s*1 and 30*s*2 are used to output two signals 37R1[1] and 37R1[2] that can be decoded (with the redundant form carry signal output by ALM 30*t*) to recreate the ripple carry input to ALM 30*s*1 from ALM 30*r*. Both of ALMs 30*s*1 and 30*s*2 are in shared arithmetic mode, and both receive all zeros as inputs 20. The normal output registers 160 in these ALMs are used to register the normal sum out signal of the ripple carry adder 36 in each ALM to produce the respective registered (pipelined) output signal 37R1[1] and 37R1[2]. ALM 30*t* is used exactly the same as ALM 30*t* in FIG. 5. Accordingly, the output 37R2 of ALM 30*t* is a registered version of the redundant form carry signal from ALM 30*r*.

FIG. 10 shows the possible states of signals 37R1[2:1] and 37R2, and how each state of these signals can be decoded to recreate a pipelined version of the ripple carry output signal of ALM 30r. For example, when all of signals 37R1[2:1] and 37R2 are 0, the pipelined ripple carry signal is 0. As another example, when signals 37R1[2] and 37R2 are both 0 but 37R1[1] is 1, the pipelined ripple carry signal is 1. ("X" in the ripple carry column in FIG. 10 denotes a combination of values of signals 37R1[2:1] and 37R2 that cannot in fact occur. These "X" lines in FIG. 10 can therefore be ignored.)

Figure 11:
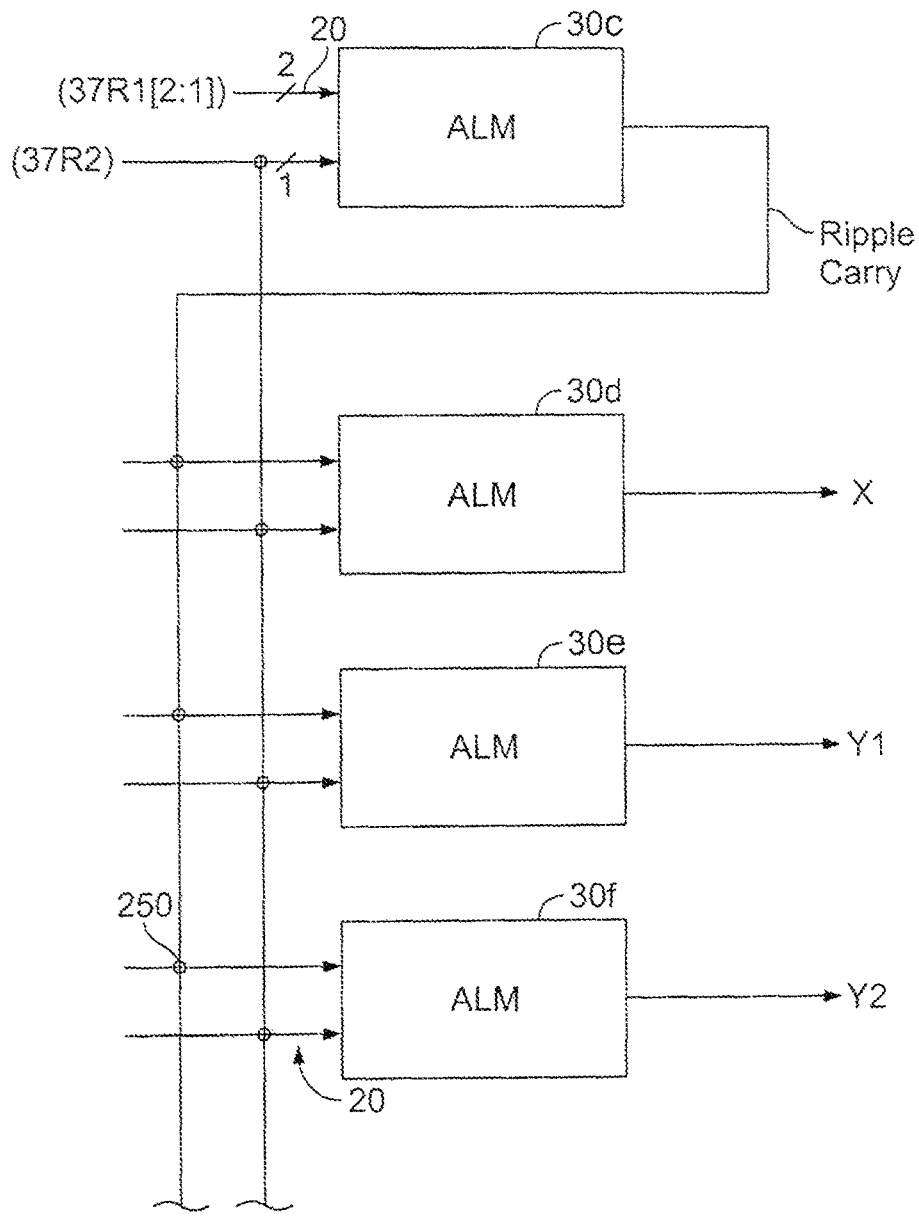
FIG. 11 is a simplified schematic block diagram of circuitry that can perform operations of the type shown in FIG. 10 in accordance with the invention.

FIG. 11 shows that another ALM 30c (e.g., in LAB 100c in FIG. 6) in normal logic mode can be used to perform the decoding shown in FIG. 10. FIG. 11 further shows that the pipelined ripple carry output signal of ALM 30c can be applied, along with the redundant form carry signal 37R2, to ALMs 30d-f. From this point on the circuitry and its operation can be exactly the same as shown in FIGS. 6-8. Thus this is another way that the redundant form addition can be restarted in LAB 100b with pipelining of both the redundant form carry signal and the ripple carry signal between an arbitrary end point of ripple carrying in LAB 100a and an arbitrary restarting point of ripple carrying in LAB 100b.

It will be understood that the foregoing is only illustrative of the principles of the invention, and that various modifications can be made by those skilled in the art without departing from the scope and spirit of the invention. For example, a long redundant form addition operation can be interrupted at any location or locations along its length as shown herein. As another example of possible modifications within the scope of the invention, in embodiments like those shown in FIGS. 5-11 the normal output registers 160 of any ALMs in the path of carry signals between LABs 100a and 100b can be used as pipelining registers for those carry signals. As just one illustration of this, instead of being used, registers 160 in ALMs 30s and 30t in FIG. 5 can be bypassed (e.g., in the manner shown for register bypass in FIG. 4), and similar output registers 160 in ALMs 30d-f in FIG. 6 can instead be used for pipelining the carry signal information.

The invention claimed is:

1. An integrated circuit comprising:
a plurality of regions of logic array block circuitry, each of which includes a plurality of subregions of logic module circuitry, each of the subregions being capable of producing (1) a redundant form sum bit signal, and (2) a redundant form carry bit signal, and each of the subregions including ripple carry adder circuitry for adding (a) a ripple carry bit signal output by a less arithmetically significant ripple carry adder circuitry, (b) the redundant form sum bit signal produced by said each subregion, and (c) the redundant form carry bit signal produced by a less arithmetically significant subregion; and
each of the regions including (i) a first register for registering a ripple carry bit signal selected from among the ripple carry bit signals of said each region, and (ii) a second register for registering a redundant form carry bit signal selected from among the redundant form carry bit signals of said each region.

2. The integrated circuit defined in claim 1 further comprising:
connections from outputs of the first and second registers of each of said regions to inputs of the ripple carry adder circuitry of a subregion in another of the regions.

3. The integrated circuit defined in claim 2 further comprising:
circuitry for selectively allowing signals to bypass the first and second registers.

4. The integrated circuit defined in claim 3 further comprising:

programmable control circuitry for controlling the circuitry for selectively allowing.

5. A method of operating an integrated circuit that includes a plurality of subregions of logic module circuitry, each of the subregions being capable of producing (1) a redundant form sum bit signal, and (2) a redundant form carry bit signal, and each of the subregions including ripple carry adder circuitry for producing a ripple carry bit signal, only a subset of said subregions being used to produce redundant form sum bit signals of input bit signals up to a predetermined threshold arithmetic significance, the method comprising:
setting the subregions that can produce ripple carry bit signals having arithmetic significance greater than the threshold to propagate the ripple carry bit signal from the subregion having the threshold arithmetic significance; and
re-applying to the subregion that can produce the ripple carry bit signal having greatest arithmetic significance the input bit signals having the threshold arithmetic significance.

6. The method defined in claim 5 further comprising:
applying to a first register the ripple carry bit signal produced by the subregion that can produce the ripple carry bit signal having greatest arithmetic significance; and
applying to a second register the redundant form carry bit signal produced by the subregion that can produce the ripple carry bit signal having greatest arithmetic significance.

7. The method defined in claim 6 wherein the plurality of subregions forms one instance of multiple such instances of plural subregions, and wherein the method further comprises:
applying output signals of the first and second registers to the ripple carry circuitry of a subregion in another of said instances that can produce the ripple carry bit signal having least arithmetic significance in said another instance.

8. The method defined in claim 5 wherein the plurality of subregions forms one instance of multiple such instances of plural subregions, and wherein the method further comprises:
outputting as a first signal the ripple carry bit signal produced by the subregion that can produce the ripple carry bit signal having greatest arithmetic significance;
outputting as a second signal the redundant form carry bit signal produced by the subregion that can produce the ripple carry bit signal having greatest arithmetic significance; and
applying the first and second signals to the ripple carry circuitry of a subregion in another of said instances that can produce the ripple carry bit signal having least arithmetic significance in said another instance.

9. A method of operating an integrated circuit that includes a plurality of subregions of logic module circuitry, each of the subregions being capable of producing (1) a redundant form sum bit signal from variable input bit signals, and (2) a redundant form carry bit signal, and each of the subregions including ripple carry adder circuitry for producing a ripple carry bit signal, only a subset of said subregions being used to produce redundant form sum bit signals up to a predetermined threshold arithmetic significance, the method comprising:
setting a first subregion, that is not part of the subset but that can receive a ripple carry bit signal from the subregion having the threshold arithmetic significance, to output the received ripple carry bit signal as a first region output signal of a region of circuitry that includes said subregions;

re-applying to a second subregion that is not part of the subset the variable input bit signals that are applied to the subregion having the threshold arithmetic significance; and setting the second subregion to output as a second region output signal of said region a signal indicative of the majority of the variable input bit signals that are re-applied to the second subregion.

10. The method defined in claim 9 wherein said region is one of multiple instances of such regions, each of which includes a respective plurality of subregions like those in said region, and wherein said method further comprises:

using the first and second region output signals to create variable input bit signals for application to a first subregion in another one of said regions to cause the first subregion in said another region to output a first ripple carry bit signal and a first redundant form carry bit signal;

applying the first ripple carry bit signal and the first redundant form carry bit signal to a second subregion in another said region; and using the first and second region output signals to create variable input bit signals for application to the second subregion in said another region to cause the second subregion in said another region to output a ripple carry bit signal that has a same value as the first region output signal and a redundant form carry bit signal that has a same value as the second region output signal.

11. The method defined in claim 10 further comprising:
applying the first and second region output signals to respective first and second registers; and
using the first and second region output signals as respectively output by the first and second registers in said using steps.

12. The method defined in claim 11 further comprising:
applying the ripple carry bit signal and the redundant form carry bit signal that are output by the second subregion in said another region to a third subregion in said another region; and
applying to the third subregion in said another region variable input bit signals for addition by the third subregion in said another region.

13. The method defined in claim 10 wherein the using the first and second region output signals to create variable input bit signals for application to the first subregion in said another region comprises:
forming three variable input bit signals for addition by the first subregion in said another region.

14. The method defined in claim 10 wherein the using the first and second region output signals to create variable input bit signals for application to the second subregion in said another region comprises:

forming variable input bit signals for addition by the second subregion in said another region.

15. A method of operating an integrated circuit that includes a plurality of subregions of logic module circuitry, each of the subregions being capable of producing (1) a redundant form sum bit signal from variable input bit signals, and (2) a redundant form carry bit signal, and each of the subregions including ripple carry adder circuitry for producing a ripple carry bit signal, only a subset of said subregions being used for addition of variable input bit signals up to a predetermined threshold arithmetic significance, the method comprising:

applying, to a first subregion that receives the redundant form and ripple carry bit signals from the subregion having the threshold arithmetic significance, predetermined input bit signals that cause the first subregion to produce a first region output signal of a region that includes the subregions;

applying, to a second subregion that receives the redundant form and ripple carry bit signals from the first subregion, predetermined input bit signals that cause the second subregion to produce a second region output signal of said region, the first and second region output signals including information from which the ripple carry bit signal having the threshold arithmetic significance can be determined;

re-applying to a third subregion that is not part of the subset the variable input bit signals having the threshold arithmetic significance; and setting the third subregion to output as a third region output signal of said region a signal indicative of a majority of the variable input bit signals that are re-applied to the third subregion.

16. The method defined in claim 15 further comprising:
using the first, second, and third region output signals to produce a recovered ripple carry bit signal indicative of the ripple carry bit signal having the predetermined arithmetic significance.

17. The method defined in claim 16 further comprising:
registering the first, second, and third region output signals.

18. The method defined in claim 17 wherein said region is one of multiple instances of such regions, each of which includes a respective plurality of subregions like those in said region, and wherein said method further comprises:
applying the recovered ripple carry bit signal and the third region output signal to the ripple carry circuitry in a first subregion in another one of said regions.

19. The method defined in claim 18 further comprising:
applying to the first subregion in said another region variable input bit signals for addition by the first subregion in said another region.

* * * * *